INVENTOR.
AMNON BROSH
BY Edward M. Farrell
ATTORNEY

June 20, 1961 A. BROSH 2,989,730

SELECTIVE CALLING SYSTEM

Filed May 15, 1957 3 Sheets-Sheet 2

INVENTOR.
AMNON BROSH
BY Edward M. Farrell
ATTORNEY

June 20, 1961 A. BROSH 2,989,730

SELECTIVE CALLING SYSTEM

Filed May 15, 1957 3 Sheets-Sheet 3

INVENTOR.
AMNON BROSH
BY Edward M. Farrell
ATTORNEY 2,989,730
SELECTIVE CALLING SYSTEM
Amnon Brosh, Philadelphia, Pa., assignor, by mesne assignments, to American Bosch Arma Corporation, Hempstead, N.Y., a corporation of New York
Filed May 15, 1957, Ser. No. 659,312
5 Claims. (Cl. 340—164)

This invention relates to selective calling systems, and more particularly to improved selection devices and circuits.

In many selective calling systems involving dialing operations, such as may be used in the telephone systems, the transmitter generally includes a multi-digit dialing device. Operation of the dialing device results in the transmission of an electrical signal in the form of pulses. One or more of a large number of receivers or subscribers within the system may be selected by dialing appropriate digits at the transmitter. The selective calling system may involve transmission by either wire or radio. The dialing device may be located in a mobile unit or at a central control station.

It is customary in many of the conventional selective calling systems to include a separate stepping coil or relay at the receiving station for each digit dialed or transmitted. Since good stepping relays are relatively expensive, it would be desirable to use only one stepping coil in systems involving the reception of two or more digits in a selective calling system. Not only would the expense of additional stepping coils be avoided by the use of a single stepping coil but, furthermore, the expense of additional complicated circuitry would be avoided at the receiving station.

In many selective calling systems, it is not only desirable to select one of a plurality of stations within a system, but it is sometimes necessary to control one or more functions at the particular station selected. Again, the use of a single stepping coil for selection as well as function control would be highly desirable.

It is an object of this invention to provide an improved selection device and circuit.

It is a further object of this invention to provide an improved selection system in which the number of stepping devices is minimized.

It is still a further object of this invention to provide an improved selection and function control device.

In accordance with the present invention, a selective calling system includes a selection device and circuit responsive to a received pulse coded signal. The selection device includes a switch having at least one bank of contacts including a start contact. A stepper arm is associated with the bank of contacts. A stepping coil is adapted to respond in steps to the received pulse coded signal to step the stepper arm from its start contact to one of the other contacts on said bank of contacts in accordance with the number of pulses in the pulse coded signal. A control circuit is actuated when the stepper arm stops at a control contact when the proper coded signal is received. A homing circuit associated with the bank of contacts returns the stepper arm to its start contact when the proper coded signal is not received. If the appropriate coded signal is received, subsequent pulse coded signals may be utilized to control one or more functions associated with a selected receiver in the selective calling system.

Other objects and advantages of the present invention will be apparent and suggest themselves to those skilled in the art in which the present invention relates, from a reading of the following specification and claims in connection with the accompanying drawing, in which:

Figure 1:
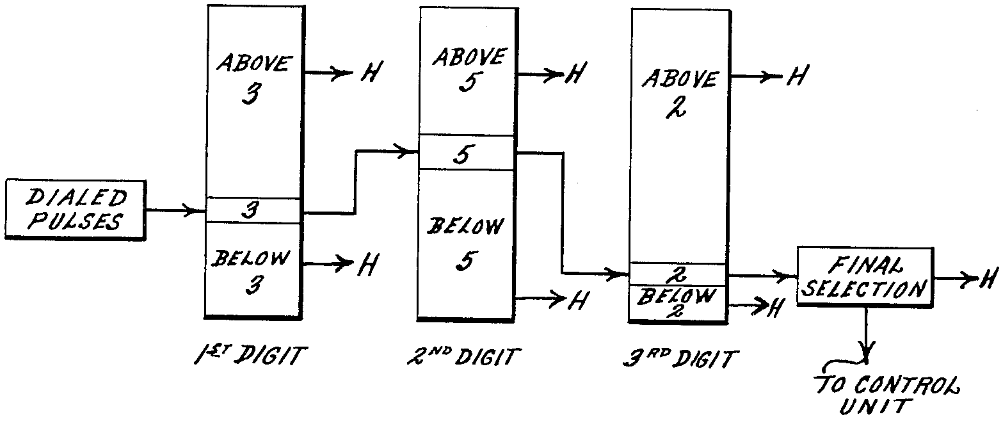
FIGURE 1 is a simplified functional block diagram utilized to illustrate the operation of one form of the present invention.

Referring particularly to FIGURE 1, assume that a receiving station is adapted to respond to a pulse coded signal representing "352." When these three digits are sequentially dialed and received, the selection unit and circuit having the code number "352" is adapted to respond.

If the first digit received is more or less than the digit "3," the selection unit and circuit is adapted to return to home, represented by "H." If the first digit dialed is the digit "3," selection unit is adapted to receive the next or second dialed digit.

If the second dialed digit is more or less than "5," the selection device and circuit is adapted to be returned to home. If the second digit dialed is "5," the selection device and circuit is adapted to respond to a third dialed digit.

If the third dialed digit is above or below the digit "2," the selection unit and circuit is adapted to return to home. If the third dialed digit is "2," the selection device and circuit is adapted to make final selection to control a function associated with the selection device and circuit. After controlling the operation of the selected function, the selection device and circuit is adapted to return to home after a short time delay, such as after the completion of the complete dialing operation.

Figure 2:
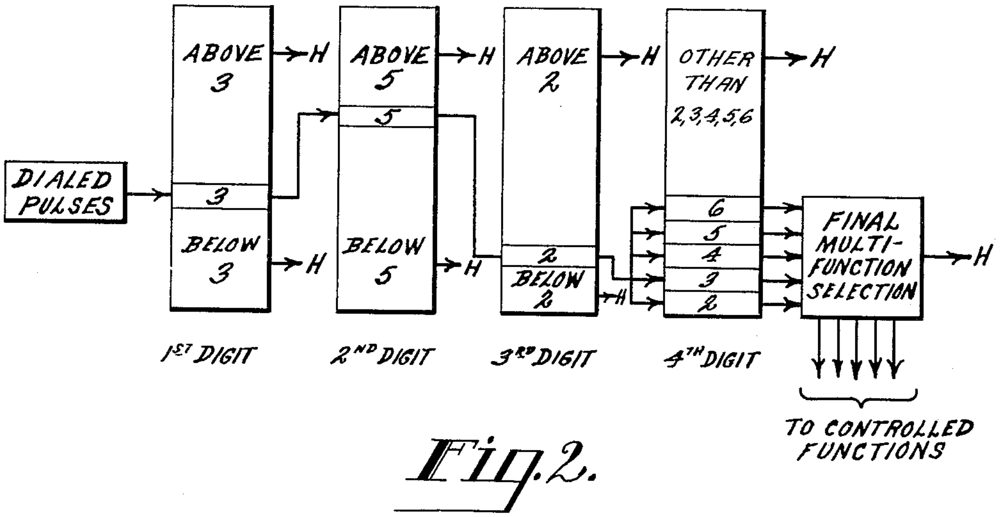
FIGURE 2 is a simplified functional block diagram utilized to illustrate the operation of a second embodiment of the present invention.

Referring particularly to FIGURE 2, the initial operation of the selection device and circuit is substantially the same as the one which may be associated with FIGURE 1. If the dialed transmitted pulse code signal is not "352" in that order, the selection device and circuit is adapted to return to home.

If the first three digits dialed are "352" in that order, the selection device and circuit is adapted to receive a fourth digit. The fourth digit controls the operation of one or a plurality of functions dependent upon the fourth digit dialed. Also, the fourth digit may relate to a function to which the selection unit and circuit is not adapted to respond, in which case the selection device and circuit will return to home. Again, after a transmission or dialing operation is completed, the selection device and circuit may be returned to home.

The complete operation of circuits and devices which may be included in FIGURES 1 and 2 is described in detail in connection with FIGURES 3 and 4.

Figure 3:
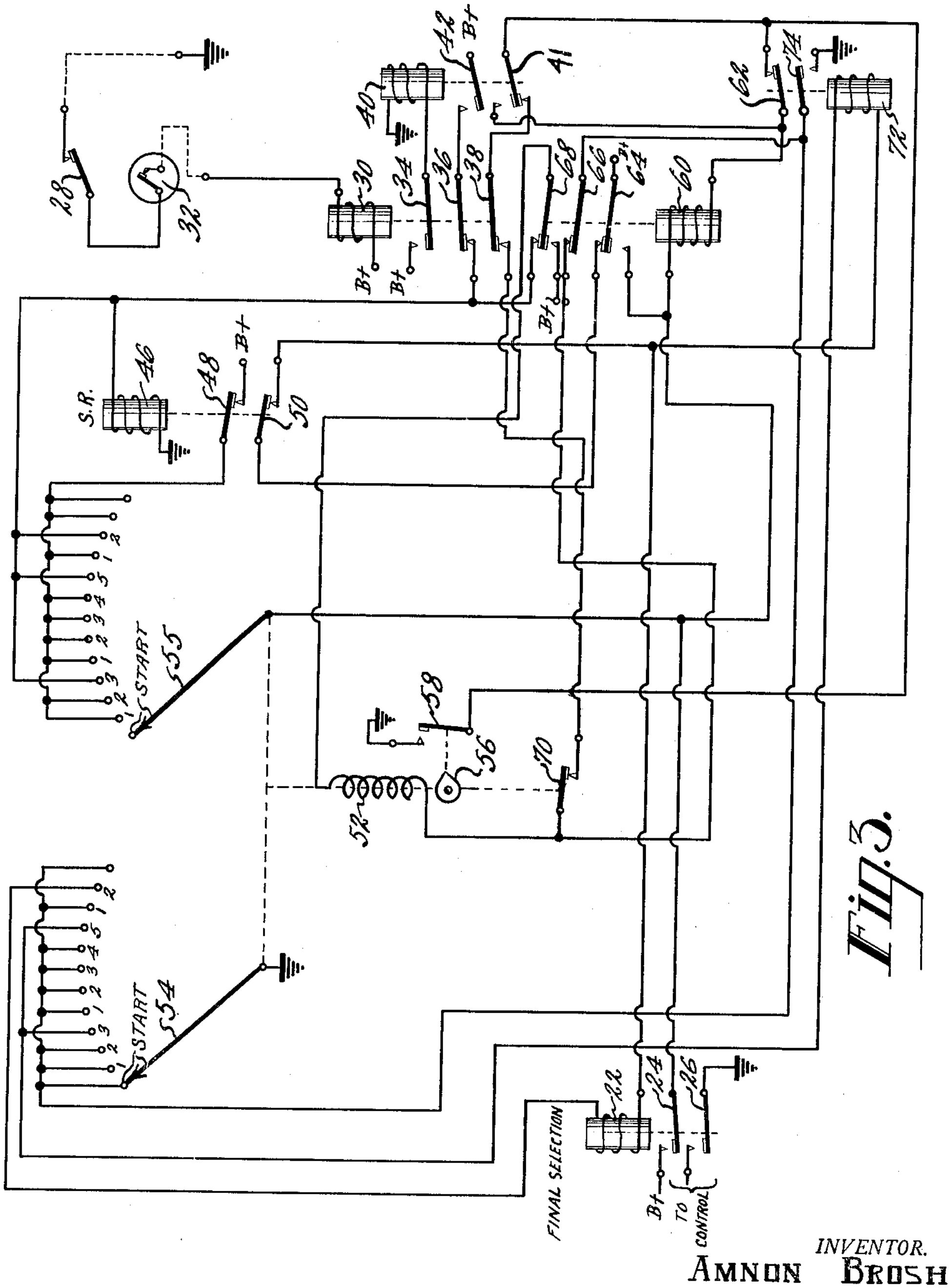
FIGURE 3 is a schematic diagram illustrating a selection unit and circuit, in accordance with the present invention; and, FIGURE 4 is a schematic diagram illustrating another embodiment of a selection device and circuit, in accordance with the present invention.

Referring particularly to FIGURE 3, there is shown a selection device and circuit illustrating one form of the present invention, the operation of which is substantially smililar to the operation outlined in connection with FIGURE 1.

In considering the operation of this circuit, assume that a particular receiving station is assigned a code number "352." When these three digits are received, it is desired to operate a relay 22 which will cause the contact arms 24 and 26 to close. If a number other than "352" is dialed, the relay 22 will remain inoperative, and subsequent dialed digits are uneffective.

When a master switch is on, such as when a mouthpiece is off its cradle at a transmitting station, a relay 30 becomes operative by a current flow through its coil from a source of B+ potential, a dial switch 32, and a master switch 28 to ground. When the relay 30 is operated, a contact arm 34 closes, and contact arms 36 and 38 open. When the relay 30 is operative, a relay 40 becomes operative since a source of B+ potential is applied through the contact arm 34, through the coil of the relay to ground. Operation of the relay 40 may be of the slow release type.

When a digit is dialed, the switch 32 is caused to open in pulses, thereby causing the relay 30 to open in pulses. There may be various circuits within a receiving station where the relay 30 may be included to achieve the desired operation. During the dialing operation, a relay 46 of the slow release type becomes operative since a source of B+ potential is applied through the contact arm 42, the contact arm 36, through the coil of the relay 46 to ground. Operation of the relay 46 causes the contact arms 48 and 50 to open. During the dialing operation, a stepping coil 52 causes stepper arms 54 and 55 to step in accordance with the opening of the relay 30. When the stepper arms 54 and 55 leave the terminals marked "start," a cam member 56 is positioned to permit a contact arm 58 to close. The contact arm 58 remains closed until the arms 54 and 55 return again to the "start" positions. The stepping action by the coil 52 is caused since B+ is applied to the coil through the contact arms 42, 36, 68 and ground is connected to the coil 52 through the contact arm 66 and the stepping arm 54.

In considering the operation of the circuit shown, first consider that the station to be selected is not "352." The first dialed digits in the case may be greater or lesser than "3." If the first digit dialed is less than "3," the station having the code number "352" is non-responsive.

When a number less than "3" is first dialed, the dialing operation stops at 1 or 2 stopping the stepping arms 54 and 55 at the first respective terminals marked "1" or "2." At this point, after a short delay, the relay 46 opens since the relay 30 is operative to open the contact arm 36 disconnecting the source of B+ from the relay 46. A source of B+ potential is applied through the contact arm 48, through the terminal at which the stepper arm 55 is stopped, through the stepper arm 55, through the coil of a relay 60, through the contact arms 62 and 58 to ground. The relay 60 thus becomes operative to actuate contact arms 64, 66, and 68. The contact 64 is connected to a source of B+ potential which is applied to the coil of the relay 60 to provide interlocking means.

When the contact arm 68 is actuated, the stepping coil 52 is disconnected from the contact arms 36 and 42. A source of B+ is supplied to the stepping coil 52 directly from the contact arm 68 when it is actuated. Actuation of the contact arm 66 removes a continuous ground connection for the stepping coil 52 through the stepping arm 54.

When a second digit is dialed, the stepping coil 52 will not be affected since no ground return is provided for its coil. Under these conditions, operation of the relays 30, 40 and 46 does not affect the operation of the stepping coil 52 when a second digit is dialed. Subsequent dialed digits will likewise not affect the operation of the stepping coil 52. Since the station numbered "352" was not selected, subsequent signals will not be effective.

Since the proper station numbered "352" was not selected, means are provided to return the circuitry to its normal inoperative conditions after the complete dialing operation relating to the selection and control functions cease. After the complete dialing operation, the contact arm 28 is opened (or no signal is transmitted from a transmitting station) and the relay 30 becomes inoperative. The contact arm 34 opens to disconnect the relay 40 from the source of B+ making it inoperative after a short delay.

A source of B+ is connected from the contact arm 68 through the stepping coil 52, through contact arms 70, 38, 41 and 58 to ground. The contact arm 70 opens for each stepping operation. The stepping operation is performed by the stepping coil 52 by moving the arms 54 and 55 each time the coil 52 is energized. Energization of the coil 52 causes the contact arm 70 to open in steps. The closing in steps of the contact arm 70 will cause the stepping arms 54 and 55 to "home" when a digit other than "3" is dialed first. The stepping coil 52 is operative or "homed" until the stepper arms 54 and 55 reach their respective "start" terminals. At this point, the cam member 56 engages the contact arm 58 causing it to open and the stepping coil 52 to stop stepping at this point. When the contact arm 58 opens, the ground return for the relay 60 through the contact arm 62 is removed. The interlocking means for the relay 60 thereby becomes inoperative causing the relay 60 to become inoperative. The circuit of FIGURE 3 is now back to the same condition as it was prior to the commencement of the dialing operation. It is noted that the contact arm 26 did not close, since the proper selection signal was not received.

Let us now assume that the first digit dialed is greater than "3." The initial circuit operation is similar to the operation described in connection with the dialing of a digit less than "3." The switch 28 is closed. The relays 30 and 40 become operative. When the digit is dialed, the relay 30 opens in pulses and the relay 46 becomes operative. The stepping coil 52 steps in accordance with the digit dialed and the contact 58 closes after the stepper arms 54 and 55 leave the "start" terminals.

When the stepper arm reaches "3," the stepping coil 52 discontinues stepping since no ground return is provided through the stepper arm 54 when this arm is at position "3." As the dialing operation continues beyond "3," the stepping coil 52 remains inoperative. B+ potential is applied to the relay 60 through the contact arms 42, 36 and the stepper arm 55 with ground being connected to the relay 60 through the contact arms 62 and 58. The relay 60 then locks itself after the initial operation since B+ potential is applied to the contact arm 64 with ground still being connected to the relay 60 through the contact arms 62 and 58. Further, dialing does not affect the system since the contact arm 68 opens to disconnect the source of B+ potential from the stepping coil 52.

After the completion of the transmission, or when the master switch 28 is opened, the relays 30, 40 and 46 become in operative and the "homing" circuit becomes operative. B+ potential is applied to the stepping coil 52 through the contact arms 70, 38, 41 and 58 during the "homing" operation. Again the "homing" operation ceases when the stepper arms 54 and 55 reach the "start" terminals and the contact arm 58 opens.

If the first digit dialed is "3" in the circuit shown and the second digit dialed is greater than "5," the stepper arms will step to "5" and remain there. The operation of the circuit will be the same as that described when the first digit was greater than "3." If the second digit dialed is less than "5" the operation of the circuit shown will be similar to the operation described when the first dialed digit was less than "3."

If the first two digits dialed are "3" and "5" in that order and the third dialed digit is either more or less than "2," the operation of the circuit shown will be the same as that described when the first dialed digit was less than "3."

Let us now assume that the station numbered "352" is desired to be selected and that therefore the first dialed digit received is the digit "3." The preliminary operations are similar to those previously described in connection with digits dialed which were less than "3." The relays 30 and 40 become operative. When the digit "3" is dialed, the relay 30 opens in pulses and the relay 46 closes through the contact arms 36 and 42. The stepping coil 52 is operated in steps since B+ is supplied through the contact arms 68, 36 and 42 with ground being provided to the stepping coil 52 through the contact arm 66 and the stepper arm 54 which is grounded. Again, the contact arm 58 is closed when the stepper arms 54 and 55 leave their "start" terminals.

After "3" is dialed the relay 46 opens after a short delay, since no B+ is applied thereto through the contact arm 36. When the contact arm 54 stops at the terminal numbered "3" and the relay 46 is open, a source of ground is connected to a relay 72 through the arm 54. A source of B+ potential is applied to the relay 72 through the contact arms 50 and 64. Operation of the relay 72 causes contact arms 62 and 74 to be actuated. The circuit remains in this operating condition until a second digit is dialed.

When the second digit is dialed, the relay 30 opens in pulses. The stepping coil 52 is actuated for a step since B+ is applied thereto through the contact arms 42, 36 and 68 and ground is connected to the coil through the contact arms 66 and 74. After one step, the contact arm 50 opens, making the relay 72 inoperative. The stepping coil 52 continues to be operated in steps since B+ is applied through the contact arms 42, 36, 68 through the coil, the contact arms, 70, 38, 44, and 58 to ground.

If the second digit dialed is "5," the operation of the circuits shown is similar to the operation described when "3" was dialed as the first digit. If the second digit dialed is less than "5," the operation of the circuit will be similar to that described when a digit first dialed was less than "3." If the second digit dialed is more than "5" the operation of the circuit will be the same as that as when the first digit dialed is more than "3."

When the coded station numbered "352" is dialed, assume that the digit "2" is dialed as the third digit after the dialing of the first two digits "3" and "5." The stepping arms 54 and 55 will be stepped by the stepping coil 52 in the manner previously described and the arms 54 and 55 will be positioned at the final terminals marked "2" on the associated banks of contacts. At this point, the relay 46 opens and the relay 22 is made operative. Ground is connected to the relay 22 through the stepper arm 54 and B+ is applied thereto through the contact arms 50 and 64. Operation of the relay 22 causes the contact arms 24 and 26 to close. Closing of the contact 26 may cause operation of appropriate circuitry to alert or otherwise affect subsequent operations of such circuitry.

When the contact arm 24 closes, B+ is applied to operate the relay 60 through the contact arms 62 and 58 to ground. The circuit is in this operating condition until a particular transmission is ended or until the master switch 28 is opened, such as by "hanging up" a telephone mouthpiece.

When the master switch 28 is opened, the relays 30, 40 and 46 become inoperative and a "homing" circuit becomes operative to bring the stepper arms 54 and 55 to their respective "start" terminals. The stepping coil 52 is operated since B+ is applied thereto through the contact arm 68 and ground is provided through the contact arms 70, 38, 41 and 58. Operation of the stepping coil 52 causes the contact arm 70 to open in steps. When the stepping arms 54 and 55 have reached their "start" positions, the cam member 56 will cause the contact arm 58 to open thereby removing the ground connection from the stepping coil 52 and preventing any further stepping operation. The circuit shown will remain in this condition until the next transmission or until the master switch 28 is closed.

The circuit described in FIGURE 3 refers particularly to a system wherein it is desired to control a single function when a proper station has been selected. In many cases, however, it is desirable that one of a plurality of functions associated with a selected station be affected by the transmitting signal. Such a system may be referred to as a multi-function control system.

Figure 4:
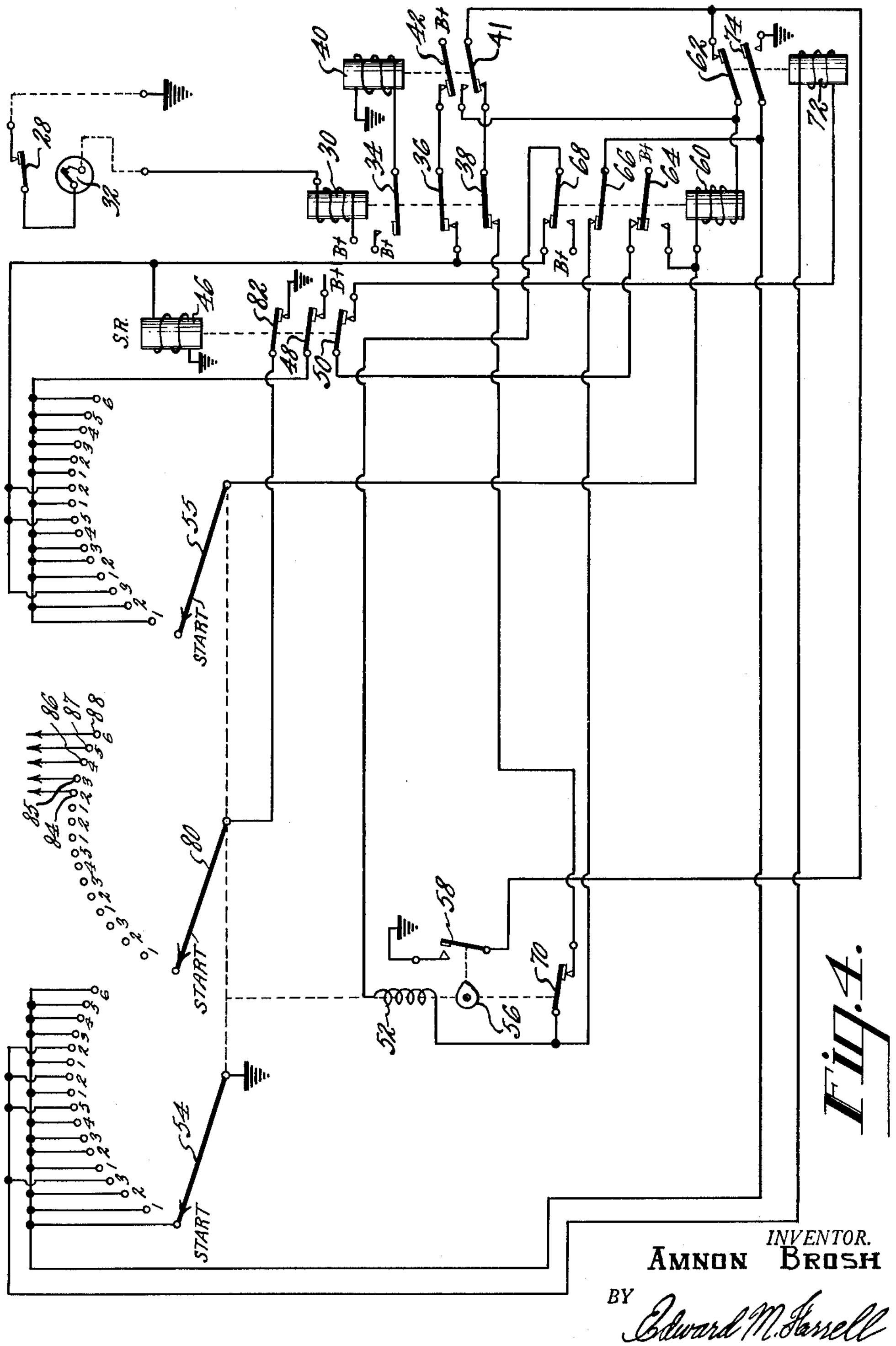

Referring particularly to FIGURE 4, a multi-function control system is illustrated. Much of the circuitry shown in FIGURE 4 relating to the initial selection is similar to that described in connection with FIGURE 3. Since similar illustrations have been given the same reference numerals as those given in FIGURE 3, the operation of the initial selection will not be described in detail. It is noted that the relay 22, together with its associated contact arms 24 and 26, are omitted in FIGURE 4, since this relay 22 is specifically related to a single function control.

In describing this circuit, it will be assumed that the station having the pulse code number "352" has been selected and that the selector arms 54 and 55 are resting upon their respective third contacts marked "2." A third selector arm 80 is associated with a bank of contacts similar to those associated with selector arms 54 and 55. The selector arm 80 is connected to a contact arm 82 which is returned to ground when the relay 46 is not operative. Like the selector arms 54 and 55 the selector arm 80, after the reception of the coded signal representing "352," will be resting upon the third contact number "2." The circuit shown is now adapted to receive a fourth transmitted digit which is transmitted to control one of a plurality of functions.

Upon the reception of the fourth digit, stepping coil 52 will be further stepped in a manner previously described causing stepper arms 54, 55 and 80 to step. The stepper arm 80 will be stepped to one of the control contacts 84, 85, 86, 87 or 88, dependent upon the digit received. Upon the termination of the transmission of the fourth digit, one of the control contacts 84 to 88 will be returned to ground through the selector arm 80 and the contact arm 82, since the relay 46 will become inoperative after a short delay. Various circuits may be connected to the terminals 84 to 88 which are controlled when one of such terminals is returned to ground. The circuits may include slow operate relays to prevent operation while selector unit is being "homed." It is thus seen that one of a plurality of functions to be controlled may be selected by transmission of a pulse coded signal. It is further seen that the initial selection and the choosing of the particular function to be controlled is achieved with the use of a single stepping coil.

After a short delay, the relay 46 becomes inoperative causing the relay 60 to operate through the contact arm 48, thereby preparing the device and circuit shown to return to home. The homing operation is similar to that previously described.

It is noted that if the first two digits dialed are "3" and "5" in that order and the third digit dialed is greater than "2," the stepper arms 54, 80 and 55 will remain and their third respective terminals marked "2" and the operation of the circuitry shown will be similar to the operation described when the first dialed digit was greater than "3."

It has been seen that the present invention has not only provided a simple device and circuit requiring a single stepping coil, but also it has provided means for minimizing the amount of complicated circuitry usually required for selection and function control.

What is claimed is:

1. In a selective calling system, the combination comprising means for receiving a pulse coded signal representing a plurality of digits, a selector circuit including a switch having at least one bank of contacts including a start contact and a plurality of select contacts, a stepper arm associated with said bank of contacts, a stepping coil adapted to respond in steps to said pulse coded signal to step said stepper arm from said start contact to one of said other contacts on said bank of contacts, means for applying said pulse coded signal to said stepping coil, a circuit connected to one of said select contacts responsive when said stepper arm stops at said select contact, means for holding said stepper arm at last stepped contact when the number of any of said plurality of digits is less than the number necessary to step said stepper arm to one of said select contacts and to hold said stepper arm at one of said select contacts when the number of any of said plurality of digits is greater than the number necessary to step said stepper arm to one of said select contacts, and a homing circuit associated with said bank of contacts to return said stepper arm to said start contact at the end of a transmission when said stepper arm is not stepped in accordance with said plurality of digits.

2. In a selective calling system, the combination comprising means for receiving a coded signal representing a series of digits sequentially transmitted in the form of pulses, a selector circuit including a switch having a bank of contacts with said bank including a start contact, a stepper arm associated with said bank of contacts on said switch, a stepping coil adapted to respond in steps to said pulse coded signal to step said stepper arm from its start contact to one of said other contacts on said bank of contacts in accordance with the number of pulses in said pulse coded signal, means for applying said pulse coded signal to said stepping coil, a plurality of select contacts disposed to represent a series of digits in said coded signal included in said bank of contacts, a control circuit adapted to be actuated when said stepper arm stops at the last disposed select contact, means for holding said stepper arm at last stepped contact when the number of any of said series of digits is less than the number necessary to step said stepper arm to one of said select contacts and to hold said stepper arm at one of said select contacts when the number of any of said series of digits is greater than the number necessary to step said stepper arm to one of said select contacts, and a homing circuit associated with said bank of contacts to return said stepper arm to its start contact at the end of a transmission when said stepper arm is not sequentially stepped in accordance with the series of digits represented by said select contacts.

3. In a selective calling system, the combination comprising means for receiving a coded signal representing a series of digits sequentially transmitted in the form of pulses, said coded signal adapted to select a predetermined selector circuit responsive to said sequentially transmitted pulses and to control one of a plurality of functions when said selector circuit is responsive to said coded signal, a selector circuit including a switch having at least one bank of contacts including a start contact and other contacts including a plurality of digital contacts for selection of a particular selector circuit, at least one stepper arm disposed to engage said bank of contacts on said switch, a stepping coil adapted to respond in steps to said pulse coded signal to step said stepper arm from said start contact to one of said other contacts on said bank of contacts in accordance with the number of pulses in said pulse coded signal, means for applying said pulse coded signal to said stepping coil, means for holding said stepper arm at last stepped contact when the number of any of said series of digits is less than the number necessary to step said stepper arm to one of said digital contacts and to hold said stepper arm at one of said digital contacts when the number of any of said series of digits is greater than the number necessary to step said stepper arm to one of said digital contacts, a homing circuit connected to said bank of contacts to return said stepper arm to said start contact when said predetermined selector circuit is not selected, a plurality of control contacts included in said bank of contacts, and means for further stepping said stepping arm to one of said control contacts when said predetermined selector circuit is selected.

4. In a selective calling system, the combination comprising means for receiving a coded signal representing a series of digits and a final digit sequentially transmitted in the form of pulses, said series of digits representing one of a plurality of stations and said final digit representing a control function, said series of digits of said coded signal being transmitted to select a predetermined selector circuit of one of said plurality of stations to make said predetermined selector circuit responsive to receive said final digit in said coded signal to control one of a plurality functions, a selector circuit including a switch having at least one bank of contacts including a start contact, a plurality of digital contacts for selection and at least one control contact associated with a controlled function, at least one stepper arm associated wtih said bank of contacts on said switch, a stepping coil adapted to respond in steps to said coded signal to step said stepper arm from said start contact to one of said other contacts on said bank of contacts in accordance with said series of digits of said coded signal, means for applying said coded signal to said stepping coil, means for holding said stepper arm at last stepped contact when the number of any of said series of digits is less than the number necessary to step said stepper arm to one of said digital contacts and to hold said stepper arm at one of said digital contacts when the number of any of said series of digits is greater than the number necessary to step said stepper arm to one of said digital contacts, a homing circuit associated with said bank of contacts to return said stepper arm to said start contact at the end of a transmission when said predetermined selector circuit is not responsive to said series of digits, a control contact included in said bank of contacts associated with a circuit for controlling a function associated with said predetermined selector circuit, and means for further stepping said stepping arm to said control contact in accordance with said last digit when said predetermined selector circuit is selected.

5. In a selective calling system, the combination comprising means for receiving a coded signal representing a series of digits sequentially transmitted in the form of pulses, a selector circuit including a switch having a bank of contacts with said bank including a start contact, a stepper arm associated with said bank of contacts on said switch, a stepping coil adapted to respond in steps to said pulse coded signal to step said stepper arm from its start contact to one of said other contacts on said bank of contacts in accordance with the number of pulses in said pulse coded signal, means for applying said pulse coded signal to said stepping coil, a plurality of select contacts disposed to represent a series of digits in said coded signal included in said bank of contacts, means for holding said stepper arm at last stepped contact when the number of any of said series of digits is less than the number necessary to step said stepper arm to one of said select contacts and to hold said stepper arm at one of said select contacts when the number of any of said series of digits is greater than the number necessary to step said stepper arm to one of said select contacts, a control circuit adapted to be actuated when said stepper arm stops at the last disposed select contact, a homing circuit associated with said bank of contacts to return said stepper arm to its start contact when said stepper arm is not sequentially stepped in accordance with the series of digits represented by said select contacts, circuit means to delay the operation of said homing circuit until the completion of a transmission when any of the sequentially received digits is higher or lower than the series of respective digits represented by said plurality of select contacts, a control contact associated with said bank of contacts, and means to further step said stepper arm in accordance with said coded signal to said control contact when said sequentially received digits correspond to the series of respective digits represented by said plurality of select contacts.

References Cited in the file of this patent

UNITED STATES PATENTS

| | | |
|---|---|---|
| 1,791,587 | Vernam | Feb. 10, 1931 |
| 2,365,284 | McClelland | Dec. 19, 1944 |
| 2,446,943 | McGoffin | Aug. 10, 1948 |
| 2,478,361 | Bartelink | Aug. 9, 1949 |
| 2,480,624 | Barnard et al. | Aug. 30, 1949 |
| 2,563,127 | McGoffin | Aug. 7, 1951 |